United States Patent [19]
Dwivedi

[11] 4,040,000
[45] Aug. 2, 1977

[54] SOLID STATE HIGH ENERGY ELECTRICAL SWITCH FOR UNDER-SEA-WATER ELECTRIC DISCHARGE SEISMIC GENERATOR

[75] Inventor: Ramesh Chandra Dwivedi, Houston, Tex.

[73] Assignee: Teledyne Exploration Company, Houston, Tex.

[21] Appl. No.: 716,462

[22] Filed: Aug. 23, 1976

[51] Int. Cl.$^2$ ............................ G01V 1/06; G01V 1/38
[52] U.S. Cl. ................................. 340/12 SD; 315/238; 315/240; 315/241 R; 315/244
[58] Field of Search ................... 340/12 SD, 7 R; 315/238, 240, 241 R, 242, 244

[56] References Cited
U.S. PATENT DOCUMENTS 3,245,032   4/1966   Knott et al. ................... 340/12 R Primary Examiner—Howard A. Birmiel
Attorney, Agent, or Firm—Murray Robinson

[57] ABSTRACT

An under-sea-water electric discharge generator includes a source of stored electrical energy connectable through solid state switch means to a cable extending to a number of pairs of electrodes to be towed under seawater. The switch means comprises an inductor in series with five main branch circuits: a capacitor discharge branch includes a plurality of SCRs connected in series and a sub-branch of RC elements for gate control with one RC element across each but an end one of the SCRs; a reverse discharge branch includes a plurality of diode means, one across each SCR. Diodes across the gate-cathode circuit of each but said one SCR protect against reverse negative voltage during reverse discharge. Static, dynamic, and over voltage branches parallel the SCR branch with one element of each (resistor, RC element, thyrector) across each SCR.

4 Claims, 3 Drawing Figures

SOLID STATE HIGH ENERGY ELECTRICAL SWITCH FOR UNDER-SEA-WATER ELECTRIC DISCHARGE SEISMIC GENERATOR

BACKGROUND OF THE INVENTION a. Field of Invention

This invention pertains to under water seismic exploration and more particularly to apparatus for generation of underwater acoustic impulses. The inventive feature resides in a high voltage solid state electrical switch for discharging a capacitor through an underwater electrode system.

b. Description of the Prior Art

The use of an electric discharge between a pair of electrodes in a liquid medium for the generation of waves of pressure and motion in the liquid is well known and is described in U.S. Pat. No. 2,167,536 (Suits), U.S. Pat. No. 3,230,506 (Hellund), U.S. Pat. No. 3,416,128 (Allen), U.S. Pat. No. 3,283,294 (Schrom).

The use of such a wave source in connection with underwater seismic exploration is described in U.S. Pat. Nos. 2,994,397, 3,251,027 and 3,286,225 to Huckabay et al., and in U.S. Pat. No. 3,286,226 to Kearsley, and U.S. Pat. No. 3,479,638 to Rusnak. Such apparatus so used is known as a sparker.

One or more suitable tip electrodes may be used in conjunction with an untipped or common electrode according to U.S. Pat. No. 3,245,032 (Knott et al.), U.S. Pat. No. 3,537,542 (Dubois). See also Technical Bulletin 652 published by Edgerton, Germeschausen & Grier, Inc.

The use of a plurality of pairs of electrode tips is known to the prior art and is currently illustrated in a brochure entitled "The Teledyne Exploration SUBot T.M. Subsea Profiler for Geologists and Engineers" published by Teledyne Exploration Company. See also "Operation and Maintenance Manual Energy Storage System, Model 27290", dated May 7, 1968, by Teledyne Exploration, "The Generation of Underwater Acoustic Impulses with Electrical Discharge Technique" dated June 1968, by W. H. Luchrmann; and the 1967 and 1968 brochures of Geotech Teledyne referring to the "SUBot" system and the Model 24218 Energy Storage System; and the Instruction Manual for the Model 24218 System; and more recently, Burrage U.S. Pat. No. 3,813,823.

Apparatus upon which the present invention is an improvement is portrayed in a publication by Teledyne Exploration Company entitled "Portable Seismic Source Model 250", although only exterior views of the equipment are given.

As indicated above, sparkers have been constructed in a variety of electrode configurations, electrical specifications and later developed into programmed sparking and exploding wire devices, etc. All of these systems have a common basic concept. First, there is an energy storate capacitor bank; second, a means to switch the stored electrical energy from the capacitor bank into a pair or pairs of electrodes at the command of a voltage trigger. Most of the switching devices at the required power level in a present day sparker system are either spark-gaps (open air plasmatic switch) or gases and vapors in an enclosed chamber which can be ionized at the command of a trigger. Because of the relative advantages of its performance, the spark-gap remains the most popular high energy switch used in the sparker systems of today.

Because of the fact that the triggered spark-gap is an open air switch (as opposed to a hermetically sealed switching junction), it has inherent drawbacks in its performance. The potential difference required across the gap in order to ionize it under the command of a specified trigger level depends upon such factors as the humidity and the temperature of air in the main gap, length of the main gap, the shape of the gap electrodes, etc. The ionization of the gap produces spot heating on the tips of the main gap electrodes resulting in its gradual degradation. Significant amount of electro-magnetic interference may be caused to the electronic equipment in the vicinity by the plasma generated in the main gap. Furthermore, the ionization of the main gap results in the loss of energy in the form of heat, light and acoustic noise. With so many factors affecting the ionization of the triggered spark-gap, it is difficult to maintain reliable trigger control of the ionization of the gap when the operating conditions change. Therefore, frequent adjustments in the length of the triggered spark-gap may be required during the start up of a sparker system when damp air may be residing in the gap and later as the changes in temperatures, humidity, power line voltages, and electrode shape due to erosion become significant. Spurious 'misfires' and 'auto-fires' can occur in the spark-gap if the gap length is not adjusted promptly.

It is an object of the invention to provide a high energy electrical switch that will neither have the problem of electrode erosion nor will generate any plasma or audible noise at the switching junction. The control of the switch will not be influenced by the changes in the humidity and temperature of the operating environment within the specifications. It is further the object of the invention to provide a high energy switch that requires no electrical or mechanical adjustments to itself or any service to itself during its operating life-span. It is a further object of this invention to provide a switch that will offer better power control than a spark-gap within the power limitations, and that will make a good substitute for spark-gaps in many applications of sparker systems used for high resolution seismic profiling of large water covered areas.

SUMMARY OF THE INVENTION

According to the invention a sparker switch comprises a series assembly of SCRs, circuits for steady state and transient voltage equalization, surge suppression circuits, and specially optimized series inductance and gate trigger circuits such that it excels a spark-gap switch in many applications of sparker systems used for continuous sub-bottom seismic profiling of large water covered areas.

A solid state switch embodying the invention may be used for switching high energy electrical pulses in aqueous media, especially sea-water, in order to generate shock waves for sub-bottom seismic profiling of large water covered areas. This apparatus provides unique advantages over existing methods that generate shock waves for such purpose.

The advantages associated with the apparatus include reliable trigger control of the switched electrical power without being affected by changes in temperature and humidity of the surrounding environment, noise free operation without correct arcing or bouncing; minimal electromagnetic radiation and start-up time; continuous operation of the apparatus for its life span with no shutdown time required for any service to the apparatus;

higher efficiency at switching power; and inherent safety in the shut-down process of the electrical system.

One unit of such a solid state high energy electrical switch was built at the laboratory of Teledyne Exploration Company and successfully tested Oct. 20, 1975. This switch is capable of switching at least 600 joules, e.g. 800 joules in less than 200 micro-seconds at 8kVDC of blocking voltage.

BRIEF DESCRIPTION OF THE DRAWINGS

For a description of a preferred embodiment of the invention reference will now be made to the accompanying drawings wherein.

DESCRIPTION OF THE PREFERRED EMBODIMENT

Figure 1:
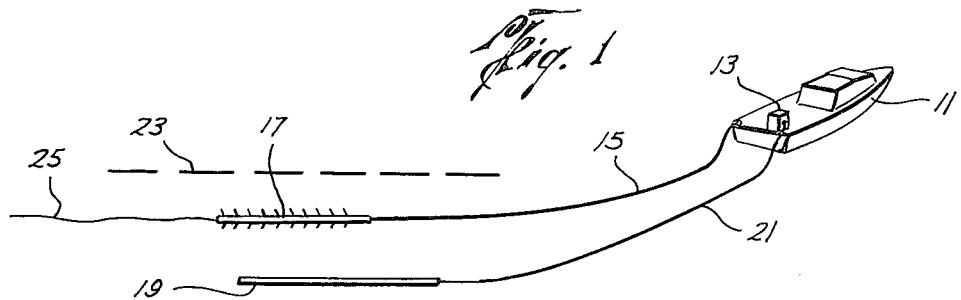
FIG. 1 is a schematic view of apparatus for conducting under sea-water seismic exploration in which otherwise known apparatus the subject invention is useful.

Referring now to FIG. 1 there is shown a tow boat 11 on which is mounted a source 13 of high voltage electric current. Connected to the current source 13 through suitable switch means is seismic cable 15. Electrode array 17 is connected to the free end of cable 15. A hydrostreamer 19 including a plurality of microphones is connected by electric line 21 to suitable recording apparatus (not shown) on the boat 11. The boat 11 tows the electrode bank 17 and the hydrostreamer 19 through the water 23 at a suitable depth below the surface. The depth range may be of the order of around 1 to 15 feet, e.g. 18 inches. The line 21 may be of about the same length as cable 15, although that is not a necessity. The seismic cable is of the order of 25 to 500 feet long, e.g. 38 feet. A tail rope 25 of perhaps 15 feet in length may be attached to the end of the electrode array, and the latter may be 5 or 6 feet long.

Figure 2:
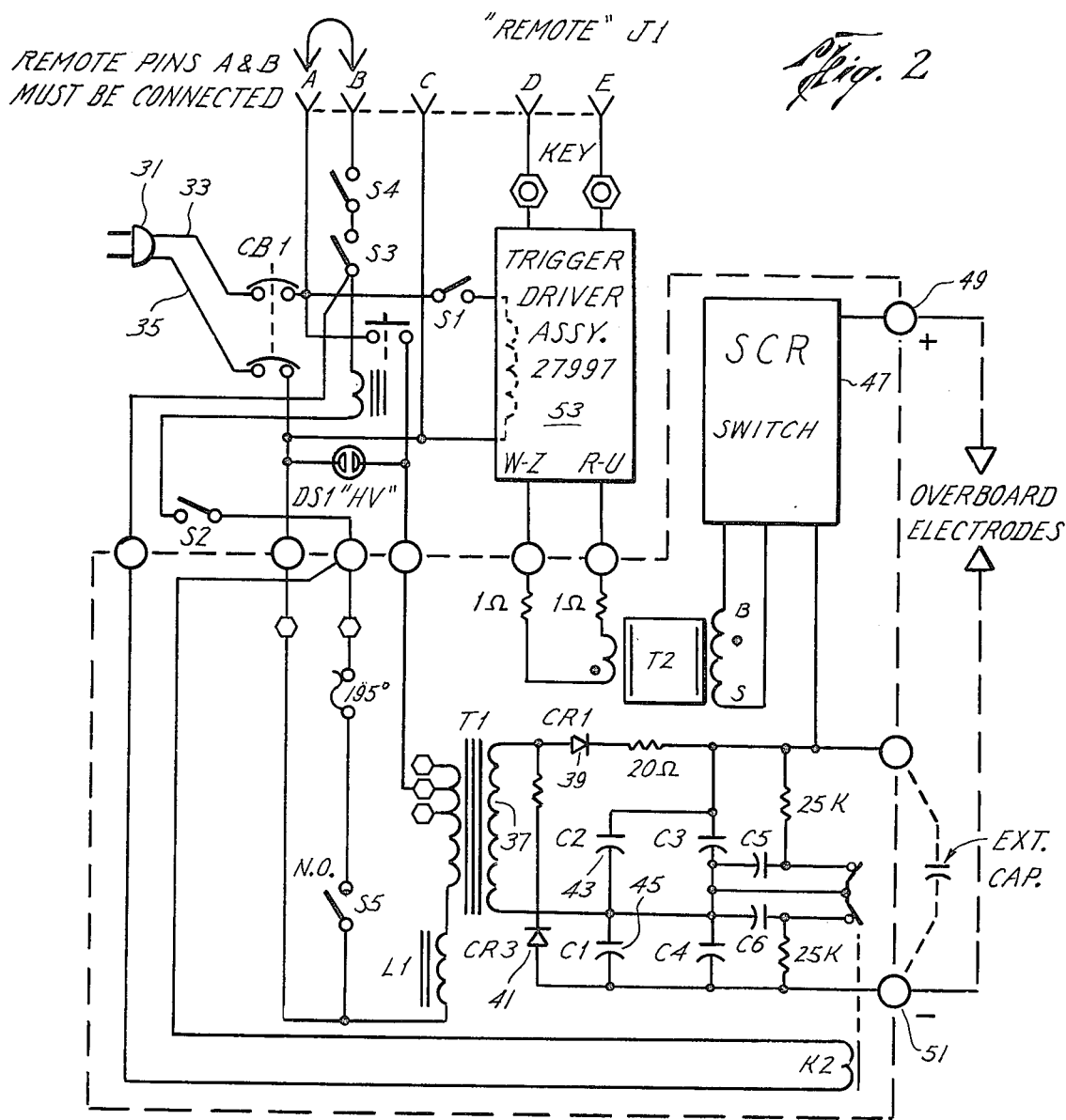
FIG. 2 is a schematic diagram of a electric circuit suitable as a source of high voltage current for an under-sea-water electric discharge seismic generator, such current source forming part of the apparatus shown in FIG. 1.

Referring now to FIG. 2 there is shown a suitable circuit for high voltage current source 13. Except for the switch, this is a known circuit and therefore need not be described in detail. Briefly, the circuit includes a plug 31 adapted for connection to the electric power system of the tow boat 11. From plug 31, conductors 33, 35 lead to voltage step up transformer 37. The output of transformer 37 is connected to silicon rectifiers 39 and 41 which a charge capacitors 43, 45. The latter are connected in series with "switch" 47 to terminals 49, 51. Whenever the switch 47 is rendered conductive by actuation of trigger means 53, high voltage (e.g. 7000 volt) current is delivered to the electrode array 17 (FIG. 1) through seismic cable 15. Switch 47 will be described in detail with reference to FIG. 3.

Figure 3:
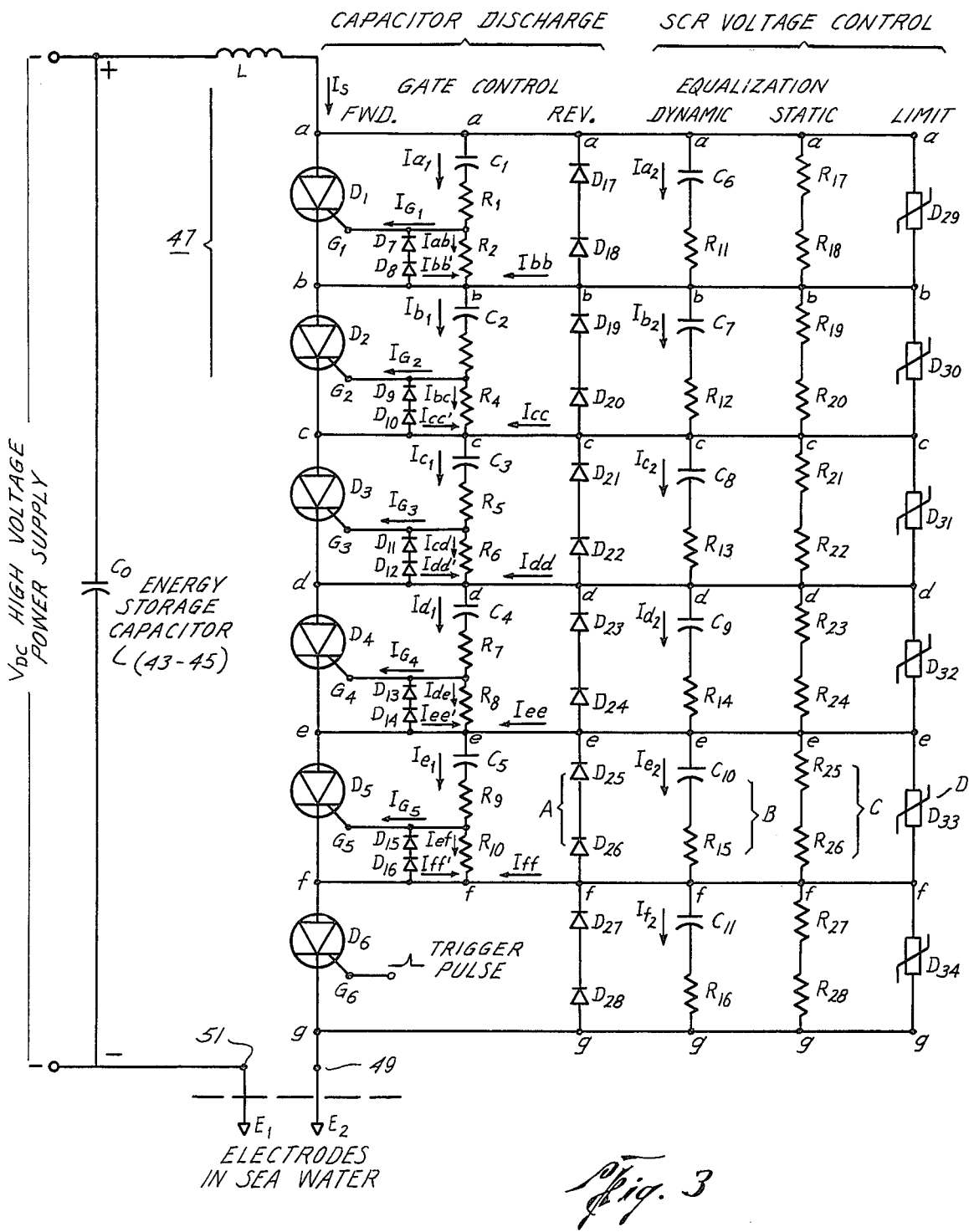
FIG. 3 is a schematic illustration of a preferred embodiment of the invention including a solid state high energy storage capacitor and discharge electrodes. The resistors R17–R28 are shown to be in pairs, e.g. R17 and R18, merely because a pair of commercially available resistors provides the right resistance. Single resistors would be functionally equivalent. Similarly, the diodes D17–D18 are shown to be in pairs, e.g. D17–D18, merely because a pair of commercially available diodes provide the right voltage and power capacity; a single diode could function equivalently.

Referring now to FIG. 3, electrical energy is stored in the capacitor Co (representing capacitors 43, 45 of FIG. 2) which has a potential difference Vdc across it. The voltage Vdc is blocked by a number of SCRs (silicon controlled rectifiers) D1, D2, D3, D4, D5 and D6, connected isotactically in series. The inductor L, in series between Co and the SCRs, serves two important functions. First, it limits the rate of rise of the forward discharge current from the energy storage capacitor Co into the series string of SCRs. Second, it helps provide a voltage pulse of reverse polarity across each individual SCR to ensure its turn-off during the subsequent charging interval of the energy storage capacitor Co. The series diode strings of D17 and D18 through D27 and D28 provide the recovery path for excess charge in each SCR immediately after the main discharge of Co.

The series combinations of resistors R17 and R18 through R27 and R28 provide static voltage equalization across the SCRs in the string. The series combinations of isotactically disposed R-C networks R11 and C6 through R16 and C11 provide transient equalization of the voltages across the SCRs in the string while the SCRs are being turned on.

The thyrector diodes D29 through D34 are used to minimize the surge voltages across each SCR. The diode strings of D7 and D8 through D15 and D16 prevent the gates of individual SCRs from receiving excessive negative voltage with respect to their respective cathodes.

The capacitor C1 in conjunction with the voltage divider resistors R1 and R2, capacitor C2 in conjunction with the resistors R3 and R4, capacitor C3 in conjunction with the resistors R5 and R6, capacitor C4 in conjunction with the resistors R7 and R8, capacitor C5 in conjunction with R9 and R10 form a sub-branch circuit, the series connected Rc circuits being connected with the circuits in series and isotactically disposed and providing gate triggers to the SCRs D1, D2, D3, D4 and D5 respectively when the gate of the bottom SCR D6 is triggered from an external source, e.g. driver 53 of FIG. 2.

A supply voltage of 8kVDC is applied on the energy storage capacitor Co of 25 microfarads. The capacitor Co stores 800 joules of electrical energy at 8kVDC. The supply voltage Vdc is equally divided among the six SCRs D1, D2, D3, D4, D5 and D6 by means of six pairs of static equalizing resistors R17 and R18 across D1; R19 and R20 across D2; R21 and R22 across D3; R23 and R24 across D4; R25 and R26 across D5; and R27 and R28 across D26. Each of these pairs of resistors had equal resistance to effect equal voltage distribution amongst the SCRs. Special provision is made in packaging the resistors R17 through R28 since they become quite warm.

When a voltage trigger pulse of sufficient magnitude is applied to the gate G6 of the bottom SCR D6 its anode to cathode voltage between points $f$ and $g$ drops to less than two volts within a few micro-seconds. This causes a charging current "Is" to flow flow from the power supply Vdc capacitor Co into the node $a$. After entering the node $a$ current Is divides into two parts $Ia_1$ and $Ia_2$.

The first part $Ia_1$ flows through C1, R1 and further divides into currents $Ig_1$ and $Iab$. Current $Ig_1$ flowing into the gate of SCR D1 starts to turn it on. The current Iab enters node $b$ and combines vectorially with the currents $Ibb$ and $Ibb'$ to generate current $Ib_1$ flowing through C2 and C3.

The current $Ib_1$ divides into currents $Ig_2$ and $Ibc$. Current $Ig_2$ flowing into the gate of SCR D2 starts to turn it on. Similarily the currents $Ig_3$, $Ig_4$ and $Ig_5$ start the turning on of SCRs D3, D4 and D5 respectively. Thus the application of a single voltage trigger pulse to the bottom SCR results in simultaneous turn on of all the SCRs in the series string.

The other part of the source current Is, illustrated in FIG. 1 as $Ia_2$ enters the R-C snubber circuit comprising C6 and R11 at node $a$. The currents $Ia_2$, $Ib_2$, $Ic_2$, $Ie_2$ and $If_2$ tend to equalize the charges in the snubber capacitors C6 through C11 in order to provide 'dynamic' equalization of voltages across the individual SCRs in the string. The value of the inductance 'L' is kept fairly low so that the enerty storage capacitor Co, the inductor L and the snubber circuit from an over-damped system.

As soon as all the SCRs are turned on in the series string, the total voltage drop across it goes down to less than 15 volts. The energy storage capacitor Co discharges through the inductor L and the plasma formed by electrical breakdown of the aqueous medium between the electrodes E1 and E2. Magnitude of the peak current observed in the main discharge ranges up to 5000 amperes. High temperatures are produced at the tips of the electrodes E1 and E2. A plasmatic bubble of ionized vapors is formed at the tip of each electrode. After the charges of the energy storage capacitor Co have neutralized, there is no source of heat or plasma to sustain the size of the bubble at the electrode tips, and it collapses to result into an implosion. Acoustic shock waves are produced from this implosion.

It is apparent that the circuit loop for the main discharge current consists of the energy storage capacitor Co, the inductor L, the series string of SCRs and the surge impedance of sea water between the electrodes E1 and E2. The value of inductance is chosen to be such that it forms a slightly underdamped circuit in series with the capacitor Co, and the surge impedance of sea water between the electrodes E1 and E2, correspondingly to electrodes 51 and 48 of FIG. 2. The underdamped system provides for a larger duration of reverse voltage across the SCR string following the main discharge to ensure the turn-off of each SCR in the string during subsequent charging of the energy storage capacitor Co. Since the SCRs cannot conduct current in the reverse direction, a low impedance reverse recovery path is provided across each of them. The series string of diodes comprising diodes numbered D17 and D18 through D27 and D28, connected in reverse direction across each individual SCR, form the reverse recovery path. However, it is possible that a particular SCR may develop excessive voltage across it during the turn-off interval of the string because of the unlike impedance characteristics of the SCRs. Thyrector diodes D29 through D34 provide surge suppression across the individual SCRs in the string.

It is evident from the previous discussions that the inductance L plays a very important role in shaping the main discharge current pulse through the SCR string. The $di/dt$, peak amplitude and the pulse-width of the main discharge current pulse can be shaped by varying the magnitude of the inductance L.

The foregoing is based upon the operation of a high energy solid state electrical switch built at the laboratory. This switch is capable of discharging 800 joules of electrical energy in a single pulse of less than 200 microseconds at a repetition rate of less than one half of a second. The high voltage power supply voltage Vdc, the capacity of the energy storage capacitor Co, number of the SCRs in the series string and the inductance L can be programmed to increase the magnitude of the switched power. Where one string of SCRs is not capable of switching large enough power, two or more can be used in parallel with proper current equalization among the individual strings. All of these variations should be considered within the scope of the invention.

Suitable values of the circuit constants and identification of suitable circuit components for a preferred embodiment of the invention are set forth in the following table.

| Component | Type | Source | Rating |
|---|---|---|---|
| D1–D6 | SCRS | International Rectifier | Type 470PB170 |
| D7–D16 | Diodes | General Electric | Type 1N5332 |
| D17–D28 | Diodes | General Electric | Type 1N5332 |
| D29–D34 | Thyrectors | General Electric | Type V420LB40A & V275LA40A (In Series) |
| Co | Capacitor | Sprague | Type PQ425 (25 $\mu$fd, 4000 VDC) |
| C1–C5 | Capacitors | General Electric | .1 $\mu$fd, 2000 VDC |
| C6–C11 | Capacitors | General Electric | .5 $\mu$fd, 2000 VDC |
| R1,R3–R9 | Resistors | Any | 10 ohms, 1 Watt |
| R2,R4–R10 | Resistors | Any | 100 ohms, 1 Watt |
| R11–R16 | Resistors | Any | 10 ohms, 1 Watt |
| R17, R19–R27 | Resistors | Ohmite | 15 K ohms, 25 Watts |
| R18, R20–R28 | Resistors | Ohmite | 15 K ohms, 25 Watts |
| L | Inductor | S.I.E. Industries | 50 micro-henry (up to 100 micro henry) |

Recapitulating, it will be seen that the switching circuit in accordance with the invention includes five main parallel or branch circuits and one sub-branch. One group of these circuits is the capacitor discharge group, which includes the forward capacitor discharge circuit through the SCRs and the reverse capacitor discharge circuit through the diodes D17–D28. A sub-branch is the gate control or trigger branch, made up of the Rc circuits C1-R1, R2 through C6-R9, R10, and the gate circuits G1 through G5 and the protective diodes D7 through D16. The trigger branch is a short branch, since it does not parallel SCR D6. Another group of the main branch circuits is the voltage control group which includes the static voltage equalization branch R17 through R28, the dynamic voltage equalization or snubber branch comprising Rc circuits C6 – R11 through C11 – R16, and the voltage limitation branch comprising thyrectors D29 through D34.

In the "static" condition immediately prior to discharge of capacitor Co, no current flows through the forward discharge branch, since the SCRs have not yet been rendered conductive, and no current flows through the reverse discharge branch, since the voltage is opposite to the direction of conductively of diodes D17, 18 - D27, 28. Likewise, no current is flowing in either the gate control branch or the dynamic voltage equalization branch since these circuits contain series capacitors and the voltage thereacross is constant.

A trickle current flows through the static voltage equalization branch to produce equal voltages across the SCRs, whose non-conductive resistances are high compared to R17–R28. The voltage across each SCR, is less than the breakdown voltage of thyrectors D29 through D33 so that no current flows through the latter.

When a trigger voltage pulse is applied to gate G6 of SCR D6, the resultant current flow renders SCR D6 conductive. The resultant drop in potential at $f$ causes current flow in the gate control branch rendering all the other SCRs conductive. During the turn-on part of the system current also flows in the portion of the dynamic voltage energization or snubber branch that is in parallel with such other SCRs. The resistances in the snubber branch circuit are low compared to the conductive voltages of the SCRs so that despite different ones of the SCRs being rendered conductive at different times the voltages thereacross remain nearly equal. The voltage equalization prevents any of the SCRs from being damaged by overvoltage.

Initially, after D6 has been triggered, capacitors C6–C10 charge up to accept the increased voltage due to SCR D6 becoming conductive. This continues for awhile even after the other SCRs become conductive due to the low values of resistance in the snubber circuit. However there is not excess voltage built up on the snubber circuit since it will be recalled the circuit thereof in series with L and Co is slightly over-damped.

Ultimately, when all the SCRs become conductive and Co starts to discharge, each of the RC circuits of the snubber branch also discharges through the SCR in parallel therewith, as does C11–R16 initially when SCR D6 is triggered.

When Co is completely discharged, inductor L causes current to continue to flow tending to recharge Co in the reverse direction. Recall that the circuit compromising Co, L1 and E1–E2 is slightly under-damped. When current flow ceases, Co produces a back voltage on the SCRs and turns them off, that is, renders them non-conductive. The reverse charge on Co is discharged through D17 through D28. There is no problem with excess reverse voltage being applied to the SCRs at the time even if one should turn off before the other since the total reverse voltage across the whole string of SCRs is low (the circuit is only slightly underdamped). However before any excess voltage can appear across an SCR at this or any other time, one of the thyrectors D29–D34 will become conductive and dissipate the voltage.

During discharge of the reverse charge on Co there is transient current flow in the gate control branch C1, R1, R2 – C5, R9, R18 which would tend to create negative potentials on the gates of the SCRs relative to their cathodes were it not for the diodes D7–D16 which short out the gate biasing resistors R2, R4, R6, R8, R10 with respect to such reverse flow.

After Co has been fully discharged of its reverse charge, current flow in the reverse discharge branch D17–D28 ceases, the current having gone through one full cycle consisting of a large positive pulse and a small negative pulse. There is no further flow across electrodes D1, E2 until the apparatus is again triggered. In the meantime, the high voltage dc power supply recharges Co in the forward direction. At the same time the capacitors of the gate control and dynamic voltage stabilization branches recharge and a trickle current flows in the static voltage stabilization branch. The current flow in the gate control circuit at this time is small, since SCR D6 is not conductive and all the current must flow through R16 or the even higher resistance R27–R28. There is therefore insufficient current flow to the gates of SCRs D1–D5 to trigger them at this time. Finally, Co and the other capacitors are recharged and the circuit reaches the static condition previously described in which current flows only in the static voltage equalization branch and the circuit awaits another trigger pulse.

Referring once more to the gate control branch, the resistors R2, R4, R6, R8, R10 are chosen so as to divide the currents $Ia_1, Ib_1, \ldots Ie_1$ with the several gates in such a manner that the gates are not triggered during charging of Co but they are triggered when SCR D6 is rendered conductive.

The resistances of resistors R1, R3, R5, R7, R9 are chosen so divide the voltage across each SCR with the resistors R2–R10 in a manner that does not apply excess positive voltage to the SCR gates with respect to their cathodes.

Although the two capacitor discharge circuits, and the gate control circuit associated with the forward capacitor discharge (SCR) circuit, and the three voltage control circuits have been described as parallel or branch circuits, the overall arrangement is in fact a mesh, since the branch circuits are cross-connected at points midway between adjacent pair of SCRs, namely at the points $a, b, c, d, e, f, g$. It is through these cross connections that the currents flow required for SCR voltage equalization and limitation and SCR gate control. This mesh, and the inductor in series therewith, form the subject switch, which is closed by a trigger pulse applied to SCR gate G6 and which automatically reopens shortly after capacitor Co is discharged. Although all of the elements of this mesh are highly desirable, it is apparent that certain components could be omitted without complete loss of switch function and durability.

For example, omission of the thyrectors would be omission of a safety factor. Without such protection an occasional anomolous voltage surge could damage an SCR, shortening the life of the switch. The same is true to a greater degree of the static voltage equilization branch resistors, and even more so of the dynamic voltage equalization branch RC elements. The diodes protecting the SCR gate circuits against back voltage could be omitted but the life of the SCRs would be reduced. The most essential elements of the mesh are the SCRs and the gate control sub-branch circuit whereby all the SCRs can be turned on almost simultaneously. An equally important element of the switch is the inductor L of sufficient inductance to overdischarge the capacitor Co and produce a back voltage to turn off the SCRs. The diodes of the reverse discharge branch allow rapid dissipation of the reverse charge on Co, which otherwise would have to be neutralized by current from the DC power supply; omission of the reverse discharge branch would slow the operation of the sparker system.

Although the main elements of the switch are SCRs, it will be understood that an SCR is a solid state semiconductor NPNP four layer device and that the invention is useful with other equivalent solid state devices having similar limitations to be overcome. See the discussion at page 1-1 of the publication entitled Silicon Controlled Rectifier Designer's Handbook published 1963 by Westinghouse Electric Corporation, copies of this and other selected pages therefrom being attached hereto and incorporated by reference.

Although the subject invention relates to a switch for a seismic sparker, it is recognized that somewhat similar circuits have been used in other applications, e.g. in dynamic test circuits for SCRs and inverters as referred to on pages 6-3, 4 and 7-14, 15, 59 of the above referred to publication, and no claim is made to such prior art circuits.

Paralleling, seriesing and protecting techniques are discussed, e.g. on pages 9-1, 2, 3, 4, 5 of the aforementioned, Westinghouse publication, and reference may be made thereto for a further discussion of the prior art of seriesing SCRs to achieve desired voltage capabilities and the problems attendant thereupon, and various solutions such as slave firing circuits employing capacitive coupling of the following anode to the driven gate (page 9-4), voltage balancing by parallel resistors (page 9-4), over voltage protection by means of RC circuits and selenium voltage suppressors (page 9-5), and surge suppressor networks (page 9-5).

Although certain elements and components of the subject circuit have been previously employed in other applications, their particular mode of combination and their employment in a sparker switching circuit with resultant advantages are believed to be new and unobvoius.

While a preferred embodiment of the invention has been shown and described many modifications thereof can be made by one skilled in the art without departing from the spirit of the invention.

I claim:

1. A seismic generator apparatus including a source of direct current,
    a capacitor means connected to said source to be charged thereby, and
    a capacitor discharge circuit connected to said capacitor means including in series in any order:
        an electrical switch, and
        an electrode system for under-sea-water conduction,
        said apparatus being capable of producing a high intensity acoustic pulse at said electrode system when said capacitor means is discharged through said electrode system, said pulse being sufficient for subbottom seismic surveying,
    said apparatus being further characterized by:
        said switch including an inductor means in series with a mesh,
        said mesh including a plurality of cross connected parallel branches for capacitor means discharge and for voltage control,
        the capacitor means discharge group of branches comprising:
            a string of a plurality of SCRs connected isotactically in series,
            a string of a plurality of series connected resistance and capacitor circuits, i.e. RC circuits, connected isotactically in series with each other and each paralleling one of the SCRs, except for one of the SCRs, forming an SCR gate control sub-branch circuit,
            an intermediate point of each resistance of said RC circuits being connected to the gate of the SCR in parallel with the RC circuit, and
            said one SCR being the one in said string of SCRs whose cathode is nearest the negative side of said source of direct current.

2. Apparatus according to claim 1,
    the capacitor means discharge group of branches further comprising:
        a plurality of diode means connected isotactically in series and cross connected so that there is one diode means in parallel with each one of the SCRs positioned to pass current from said capacitor means in the opposite direction from said SCRs.

3. Apparatus according to claim 2,
    said voltage control branches including:
        a plurality of like resistance circuits connected in series and cross connected so that there is a resistance circuit in parallel with each of the SCRs,
        a plurality of like series connected RC circuits (separate from the previously mentioned RC circuits) connected in series and cross connected so that there is an RC circuit in parallel with each of the SCRs, and
        a plurality of like thyrectors connected in series and cross connected so that there is a thyrector in parallel with each of the SCRs.

4. Apparatus according to claim 3,
    said capacitor means having an energy storage capacity at the voltage of said source of direct current of the order ot at least 600 joules, sufficient to create said acoustic pulse when discharged through said electrode system,
    the first said capacitor discharge branch further including across the gate circuit of each of said SCRs, except said one SCR, diode means for passing current from the cathode of the SCR to the gate of the SCR.

* * * * *

UNITED STATES PATENT AND TRADEMARK OFFICE
CERTIFICATE OF CORRECTION

PATENT NO. : 4,040,000
DATED : August 2, 1977
INVENTOR(S) : RAMESH CHANDRA DWIVEDI It is certified that error appears in the above-identified patent and that said Letters Patent are hereby corrected as shown below:

Column 1, line 58, change "storate" to -storage-.

Column 2, line 65, change "correct" to - contact-.

Column 4, line 68, change "C3" to -R3- .

Column 5, line 15, change "enerty" to -energy-.

Column 5, line 40, change "ingly" to -ing-.

Column 6, line 43, change "C6-R-9," to -C5-R9,-.

Column 7, line 7, change "energization" to -equalization-.

Column 3, line 47, change "surfact." to -surface.-.

Column 4, line 59, delete the additional "flow".

UNITED STATES PATENT AND TRADEMARK OFFICE
CERTIFICATE OF CORRECTION

PATENT NO. : 4,040,000
DATED : August 2, 1977
INVENTOR(S) : Ramesh Chandra Dwivedi It is certified that error appears in the above-identified patent and that said Letters Patent are hereby corrected as shown below:

Column 8, line 11, change "so" to -to-.

Column 9, line 20, change "voius" to -vious-.

Signed and Sealed this

Fourth Day of April 1978

[SEAL]

Attest:

RUTH C. MASON
*Attesting Officer*

LUTRELLE F. PARKER
*Acting Commissioner of Patents and Trademarks*